United States Patent
Ratfisch

(10) Patent No.: US 8,393,185 B2
(45) Date of Patent: Mar. 12, 2013

(54) DRIVER FOR FASTENING TO A SHEET METAL DRUM OF A LAUNDRY MACHINE

(75) Inventor: Uwe Ratfisch, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 13/359,517

(22) Filed: Jan. 27, 2012

(65) Prior Publication Data

US 2012/0118025 A1    May 17, 2012

Related U.S. Application Data

(62) Division of application No. 11/662,437, filed as application No. PCT/EP2005/054382 on Sep. 6, 2005, now Pat. No. 8,161,621.

(30) Foreign Application Priority Data

Sep. 9, 2004  (DE) .......................... 10 2004 043 716

(51) Int. Cl.
*D06F 37/00* (2006.01)
*D06F 39/00* (2006.01)

(52) U.S. Cl. ... 68/212; 29/524.1; 29/525.07; 29/243.53; 68/142; 69/30; D32/29

(58) Field of Classification Search .................. 29/505, 29/521, 524.1, 525.01, 525.05, 525.06, 525.07; 29/243.53; 68/16, 139, 142, 212, 233; 69/30; D32/6, 29
See application file for complete search history.

(56) References Cited

U.S. PATENT DOCUMENTS

| | | | | |
|---|---|---|---|---|
| 1,935,691 A | * | 11/1933 | Arnot ............................. | 68/142 |
| 2,458,152 A | | 1/1949 | Eakins | |
| 2,586,794 A | * | 2/1952 | Douglas ......................... | 68/142 |
| 2,705,346 A | * | 4/1955 | Schlabach et al. ............ | 264/249 |
| 5,153,978 A | | 10/1992 | Simmons | |
| 5,361,483 A | | 11/1994 | Rainville et al. | |
| 5,535,604 A | * | 7/1996 | Rodrigues et al. ................ | 68/28 |
| 2003/0074932 A1 | * | 4/2003 | No et al. ........................... | 68/58 |
| 2004/0129036 A1 | * | 7/2004 | Ratfisch ........................ | 68/142 |
| 2005/0034431 A1 | | 2/2005 | Dey et al. | |
| 2005/0097927 A1 | * | 5/2005 | Kim et al. ......................... | 68/24 |
| 2005/0125985 A1 | | 6/2005 | Adams et al. | |
| 2005/0204783 A1 | * | 9/2005 | Kim et al. ...................... | 68/3 R |

FOREIGN PATENT DOCUMENTS

| | | |
|---|---|---|
| DE | 2707224 A1 | 8/1978 |
| DE | 3803195 A1 | 8/1989 |
| DE | 275366 A3 | 1/1990 |
| GB | 1161219 A | 8/1969 |
| JP | 57195616 A | 12/1982 |
| JP | 10235086 A | 9/1998 |
| JP | 2004105250 A | 4/2004 |

OTHER PUBLICATIONS

International Search Report PCT/EP2005/054382.

* cited by examiner

*Primary Examiner* — David Bryant
*Assistant Examiner* — Christopher Koehler
(74) *Attorney, Agent, or Firm* — James E. Howard; Andre Pallapies

(57) ABSTRACT

Fastening plastic drivers in a washing machine drum having at least two domes on the inside, which comprise a cavity extending along its center line, and are oriented perpendicular to the sheet casing of the drum and which serve to fasten the driver. A hole pattern corresponding to the arrangement of the domes of a driver is punched into the sheet casing of the drum. The driver is placed with its dome ends, which project beyond the contact surface of the driver with the sheet casing, onto the sheet casing so that the dome ends pass through the holes of the hole pattern. Counter holders are inserted from the opposite side into the cavities of the domes. From the fastening side, hold-down elements are driven against the sheet casing. Heated form punches are driven against the dome ends until the dome ends have mushroom-shape ends.

5 Claims, 4 Drawing Sheets

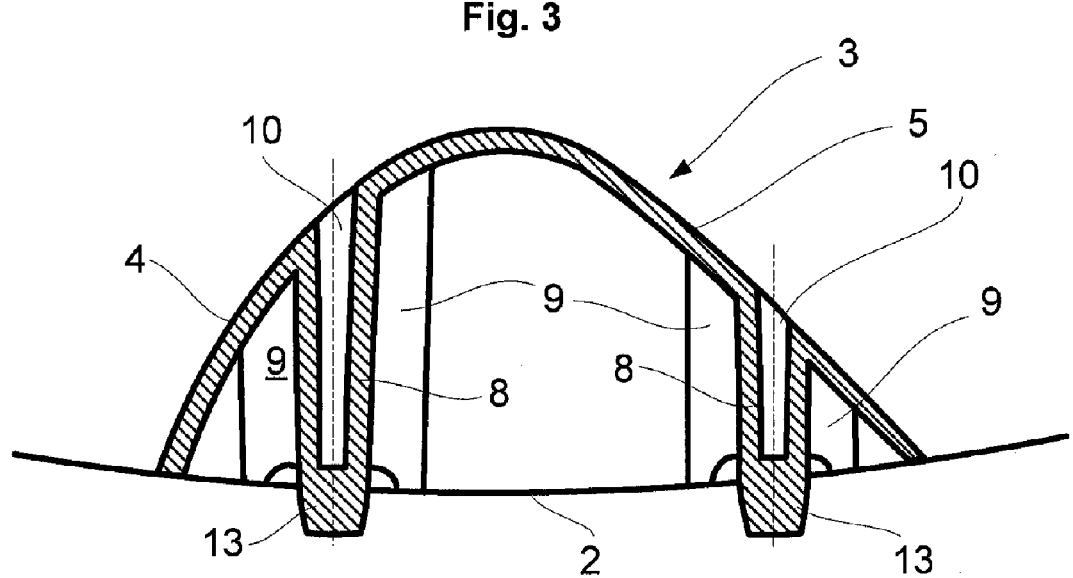
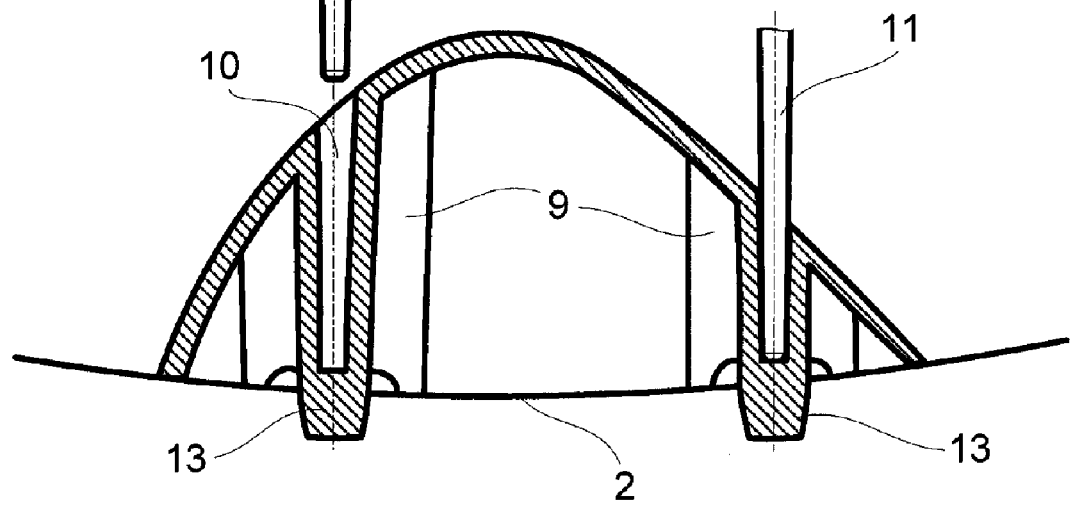

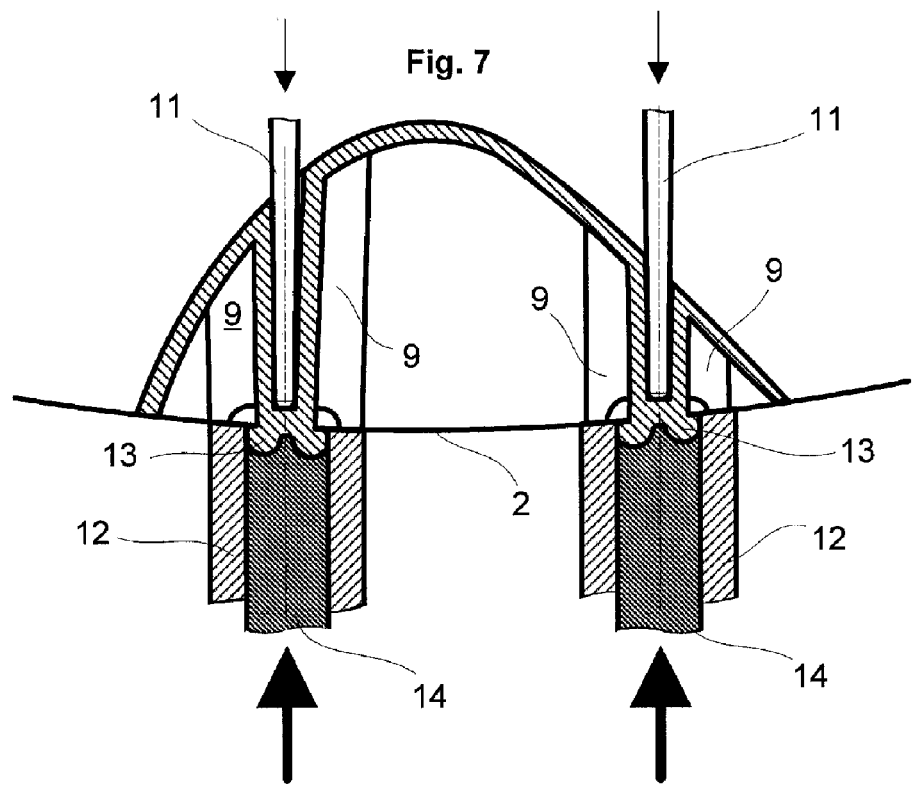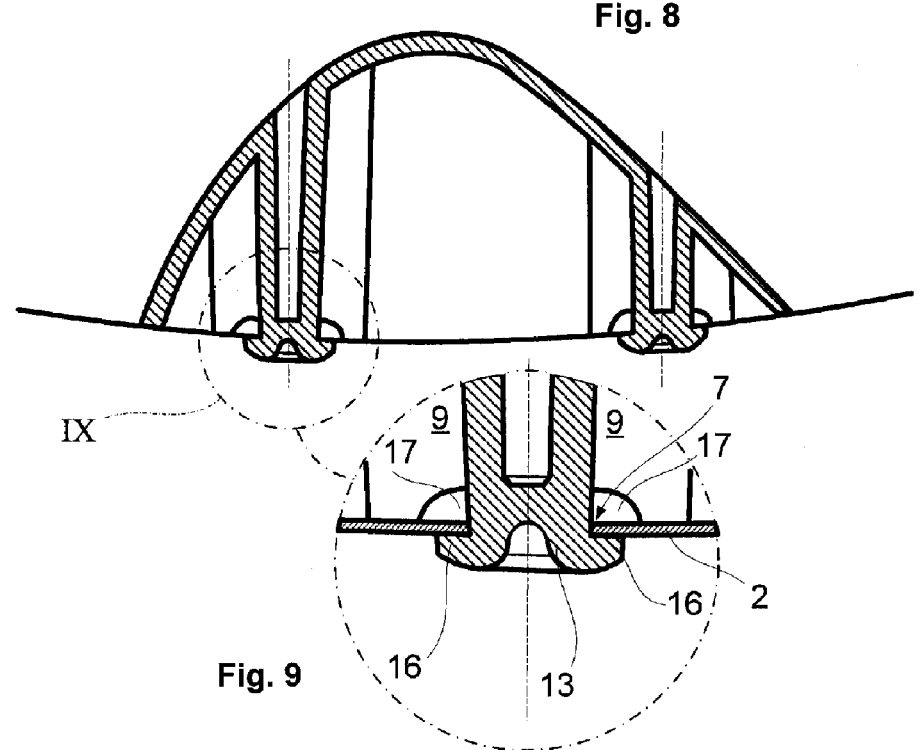

# DRIVER FOR FASTENING TO A SHEET METAL DRUM OF A LAUNDRY MACHINE

CROSS-REFERENCE OF RELATED APPLICATIONS

This application is a Divisional, under 35 U.S.C. §121, of U.S. application Ser. No. 11/662,437, filed Mar. 9, 2007, which is a U.S. national stage application of PCT/EP2005/054382 filed Sep. 6, 2005, which designated the United States; this application also claims the priority, under 35 U.S.C. §119, of German patent application No. 10 2004 043 716.5 filed Sep. 9, 2004.

BACKGROUND OF THE INVENTION

The invention relates to a method for fastening a plastic driver made of hot-deformable plastic in a laundry drum of a washing or drying machine, wherein the driver or drivers have at least two domes on the inside, which comprise a cavity extending along its centre line, which are oriented perpendicularly to the sheet casing of the laundry drum and which serve to fasten the driver.

Such fastening methods are known (GB 1 161 219). In this case, the drivers consisting of plastic are usually prepared for fastening in such a manner that a type of dome has a rectangular cross-section and its ends which have lugs which extend sideways at right angles engage behind an edge of a likewise rectangular gap in the sheet casing. The drivers are fixed in the position predetermined by the rectangular gaps by means of a second type of domes whose cavities are suitable for screwing thread-forming screws and which merely abut from inside against the edge of the allocated hole on the sheet casing.

Drivers consisting of plastic in washing drums of high-quality washing machines are usually fastened to the inside of the sheet casing in this manner. However, it has been shown that this type of fastening of drivers cannot be made any cheaper in assembly by any rationalisation measure.

BRIEF SUMMARY OF THE INVENTION

It is thus the object of the invention to provide a shape of drivers and a fastening method related thereto in which the requirements for automatic assembly are provided.

For the solution of this object the invention proposes that
a. a hole pattern corresponding to the arrangement of the domes of a driver is punched into the sheet casing of the washing drum;
b. the driver is placed with its dome ends which project beyond the contact surface of the driver with the sheet casing, onto the sheet casing so that the dome ends pass through the holes of the hole pattern,
c. counter holders are inserted from the opposite side into the cavities of the domes,
d. from the fastening side, hold-down elements are driven against the sheet casing,
e. from the fastening side, form punches are driven against the dome ends which bring about heating of the dome ends until the dome ends have mushroom-shaped ends which are formed in the hot forming process and which, with their brims externally rest against the areas of the sheet casing that surrounds the holes
f. and finally, all form punches, hold-down elements and counter holders are returned in this order.

In one embodiment of the invention, a fastening tool for carrying out the method is provided in which in the arrangement of the hole pattern, slightly conically shaped counter holders are fastened in such a manner that their ends come to rest under pressure against the bottoms of the cavities in the domes when the contact surface of the driver rests on the inside of the sheet casing. The conicity of the counter holders is selected in a known manner for the person skilled in the art so that the counter holders can easily be pulled from the cavity of the dome again after fastening the driver. The ends should press towards the counter holders if possible with the same force on the bottoms of the cavities so that the drivers abut uniformly at all locations and are free from play against the drum casing.

In another embodiment of the invention, the hold down elements are arranged in processual operative connection with the counter holders in such a manner that they are juxtaposed to internal parts of the driver which extend in the vicinity of the dome as far as the inner surface of the sheet casing and can be driven as far as the sheet casing which is pressed firmly against the internal parts for their working use and that form punches with mushroom-head shaped ends formed as a negative mold are arranged so that they match the hole pattern. In addition, after the counter holding and holding down these can be driven so far towards the dome ends until a sufficiently wide brim for fixing has formed on each dome end.

In a further development of the invention, it is advantageous if the domes have surrounding supporting walls which extend as far as the inner surface of the sheet casing and that each hold-down element has a hollow-cylindrical end surrounding an allocated form punch. This combination of features of the driver and the fastening tool ensures that the driver abuts absolutely securely against the inner surface of the sheet casing before the hot forming process begins. This measure ensures a permanently secure fastening of the driver.

The further developments of the method and the fastening tools for carrying out the variants of the method described in the dependent claims can be advantageously applied in any combination with one another.

BRIEF DESCRIPTION OF THE DRAWINGS

The invention is explained in detail hereinafter with reference to an exemplary embodiment shown in the drawings. In the figures:

FIG. 3 is a cross section through a driver after insertion into the sheet casing, FIG. 4 is a cross section as shown in FIG. 3 during insertion of the counter holders, FIG. 7 is a cross section as shown in FIG. 6 during forming the mushroom shaped ends of the dome ends by the hot form punches, FIG. 8 is a cross section through a fastened driver as shown in FIG. 6, and FIG. 9 is an enlarged view of the cutaway mushroom shaped end according to the detail IX in FIG. 7.

DETAILED DESCRIPTION OF EXEMPLARY EMBODIMENTS OF THE PRESENT INVENTION

Figure 1:
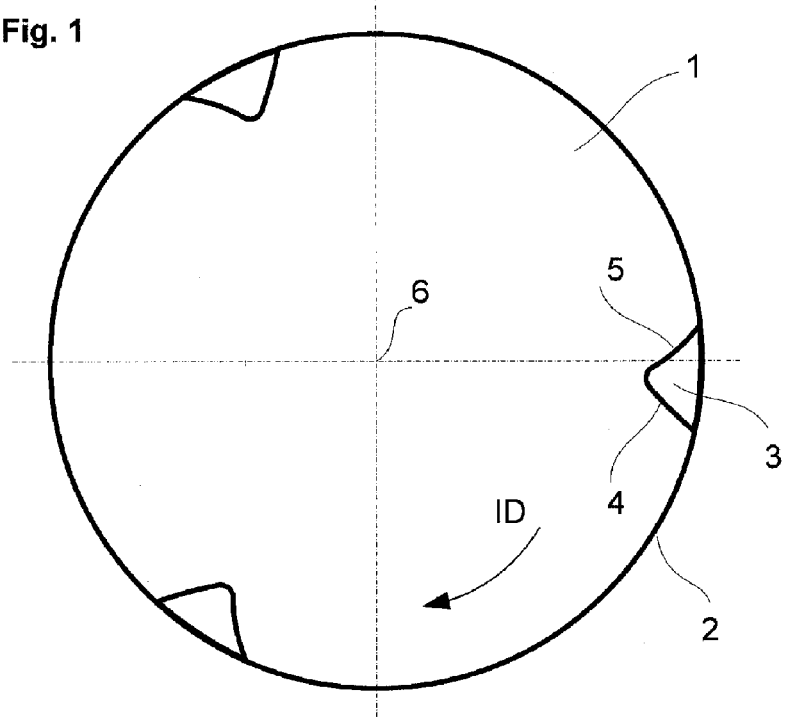
FIG. 1 is a schematic cutaway view of a washing drum with internally attached drivers.

The washing drum 1 shown schematically and in cross-section in FIG. 1 contains three laundry drivers 3 distributed uniformly on the inside of its drum casing 2, the cross section of said drivers being asymmetrical. The flank 4 of the driver 3 located at the front in the intensive direction of rotation ID is arranged more steeply with respect to the inner surface of the drum casing 2 than the flank 5 located at the rear in the intensive direction of rotation ID of the washing drum 1. As a result, less sensitive washing can be more intensively treated mechanically in the intensive direction of rotation ID than sensitive washing in the opposite direction because less steep flanks act mechanically on the laundry in the opposite direction.

Figure 2:
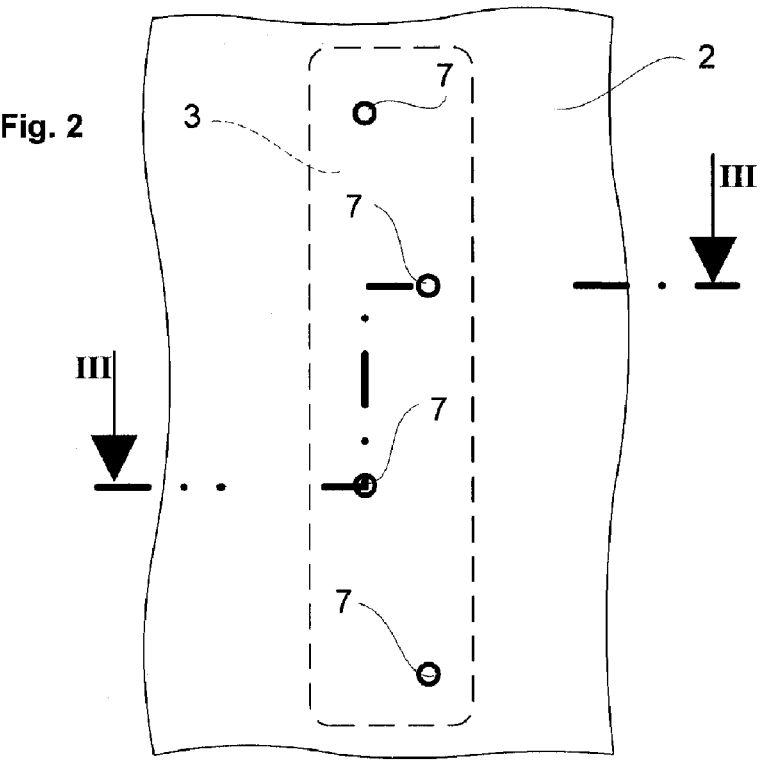
FIG. 2 is a view of a hole pattern for the dome of a driver used for fastening.

FIG. 2 is a view from outside washing drum 1 in the vicinity of a driver 3. Structures of the drum casing 2, such as flooding holes or embossed patterns have been omitted so that the interior driver 3 can be more easily identified. The driver 3 is shown by the dashed line on the inner side of the drum casing 2. Said driver is mounted approximately parallel to the drum axis (FIG. 1) and for this purpose has four domes 8 arranged in the pattern of the holes 7 (FIG. 3), which penetrate through the holes 7.

The driver 3 together with this part of the drum casing 2 is shown in cutaway view in FIGS. 3 to 8 along the plane of intersection III in FIG. 2. For this purpose, the driver 3 is formed from a shell of a plastic injection molding which is open at the bottom (towards the drum casing 2), which is substantially hollow but has four domes 8 directed perpendicularly to the drum casing 2 and two to four interior internal parts in the form of star-shaped wings 9 each grouped around a dome 8. The domes 8 for their part likewise have cavities 10 that extend over a considerable part of their length and, in this example, to a point above the level of the inner surface of the drum casing 2.

Figure 5:
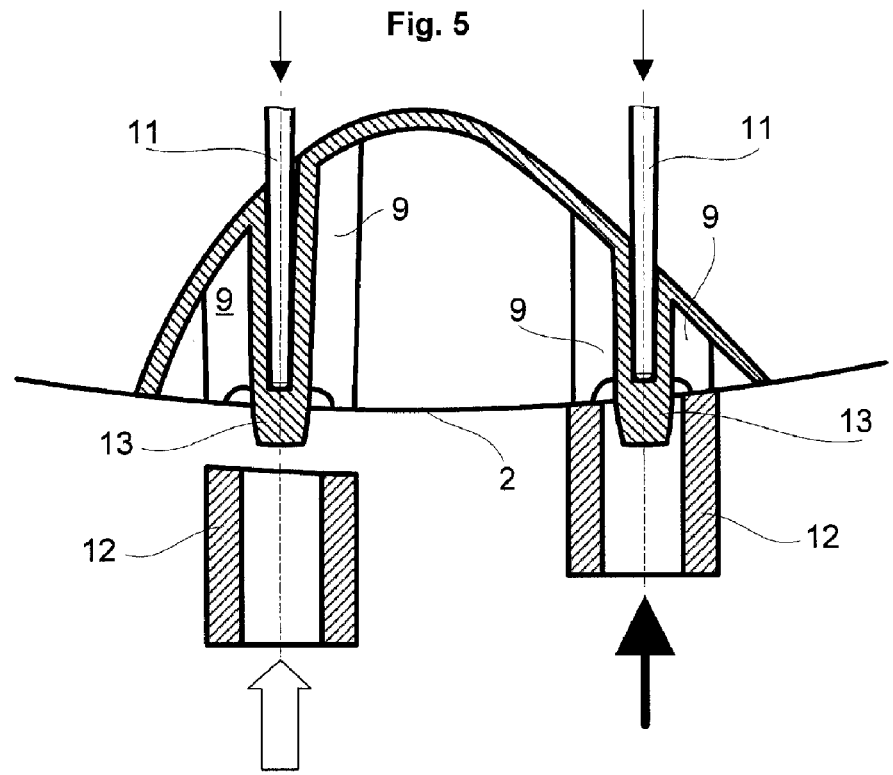
FIG. 5 is a cross section as shown in FIG. 3 when putting the hold-down elements in place.

For fastening such a driver 3, said driver is initially placed according to FIG. 3 from the interior of the washing drum 1 on the drum casing 2 and inserted with the domes 8 into the holes 7. Then, counter holders 11 are driven simultaneously into the cavities 10 of all the domes 8 as far as the base of the cavities 10 (FIG. 4) so that the driver 3 transmits approximately the same contact pressure to the drum casing 2 on all contact surfaces. From the fastening side of the dome 3 (that is the outside of the drum casing 2) hold-down elements 12 are driven against the sheet metal of the drum casing 2 (FIG. 5). These hold-down elements 12 are likewise hollow with a diameter which preferably encircles the dome ends 13 at a distance. The hold-down elements 12 are preferably driven simultaneously into the working position like the counter holders 11 so that the sheet metal of the drum casing 2 is pressed uniformly against the contact surfaces of the driver 3. The wings 9 are provided to enlarge the contact surface of the driver 3, the front faces of these wings withstanding the pressure of the hold-down elements 12.

Figure 6:
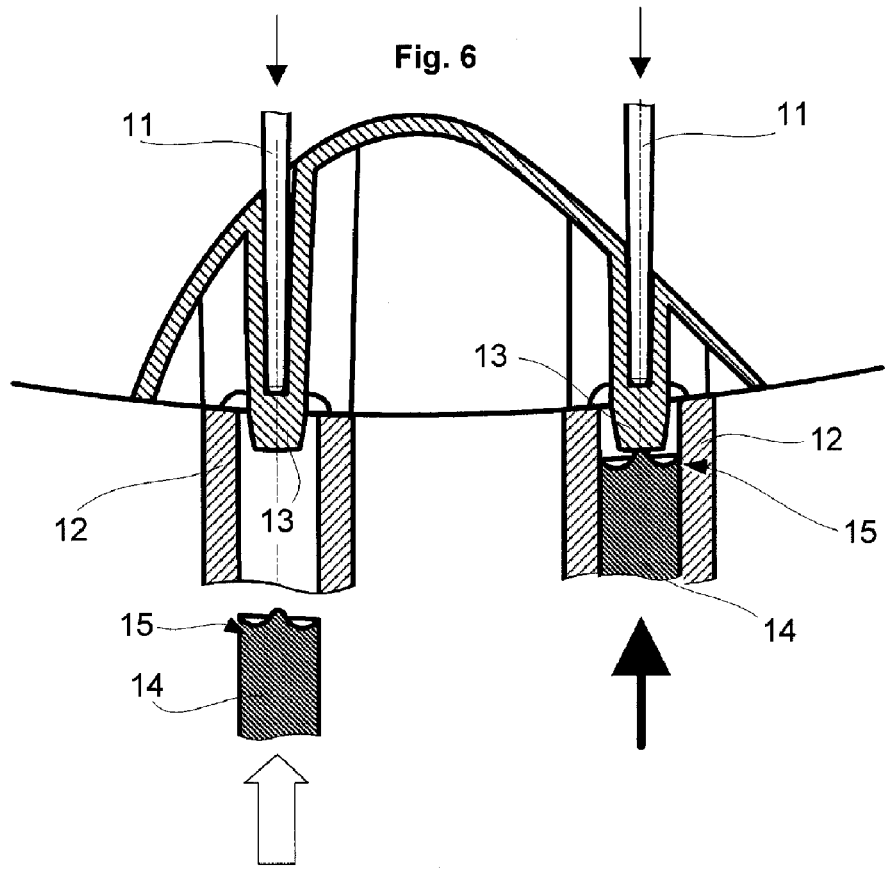
FIG. 6 is a cross section as shown in FIG. 3 during insertion of the form punches.

According to FIG. 6, form punches 14 are inserted into the cavities of the hold-down elements 12, these form punches having been previously heated and their front parts 15 having mushroom-head shaped ends formed as a negative mold. As soon as the warm front parts 15 reach the dome ends 13, the dome ends begin to melt and adapt to the mushroom shape of the front parts 15. In this case, the material of the dome ends 13 is expelled sideways and will fill the space below the form punches 14 and inside the cavity of the hold-down elements 12 (FIG. 7). The brim of the mushroom-shaped dome ends 13 thus formed rests externally on the sheet metal of the drum casing 2 and cools down after withdrawal of the form punch 14 until finally the hold-down elements 12 and the counter holders 11 can also be withdrawn without the newly formed mushroom shape of the dome ends 13 reforming The driver thus sits firmly on the drum casing 2 (FIG. 8).

Instead of or in addition to preheating of the form punches 14, as soon as the form punches 14 have been driven into the contact position to the dome end 13, they can be excited mechanically with an ultrasound signal which they transmit to the dome ends. As a result, the co-vibrating plastic of the dome ends 13 is heated substantially faster than the form punches 14 so that the form punches 14 remain almost cold whilst the dome ends 13 are transformed very rapidly to a viscous melt and acquire a mushroom shape following the pressure of the form punches 14. The oscillation pulse can thereby be controlled as required so that only the amount of heat required to re-melt the dome ends 13 into the desired mushroom-shape ends (FIG. 8) is produced.

In the detail IX from FIG. 8 shown in FIG. 9, it can be seen that the brim 16 of the dome end 13 abuts against the drum casing 2 in a surrounding region of the hole 7, which is not supported by the opposite side as a result of recesses 17 of the wings 9. The sheet metal of the drum casing 2 springs backwards somewhat so that the brim 16 of the dome end 13 securely holds the driver under spring tension on the sheet casing. This prevents a fastened driver 3 from being able to come loose from the sheet casing to such an extent that the drivers would rattle and finally the joint would be broken as a result of the subsequent continuous relative movement towards the sheet casing.

What is claimed is:

1. A driver for fastening to a sheet casing of a drum of a laundry machine, the driver comprising:
    an outside surface that is configured to contact laundry in the drum;
    an edge that is configured to contact the sheet casing when the driver is fastened to the sheet casing;
    an inside that is opposite to the outside surface, and faces the sheet casing and is enclosed by the sheet casing when the driver is fastened to the sheet casing;
    at least two domes on the inside and extending away from the outside surface, each dome being oriented such that it will be perpendicular to the sheet casing when fastened to the sheet casing;
    a solid portion at the end of each dome; and
    a cavity in each dome that extends along the centre line of the dome, the cavity stopping at the solid portion,
    wherein each dome is configured to being inserted into a hole in the sheet casing such that a deforming portion of the solid portion of each dome extends beyond the sheet casing,
    each cavity is configured to receive a counter holder during a fastening process such that the counter holder supports the dome during the fastening process; and
    the deforming portion is configured to deform during the fastening process by being heated and molded by a form punch until the deforming portion deforms into a mushroom-shaped end which rest against the sheet casing in an area around the hole.

2. The driver according to claim 1, wherein the deforming portion is configured to deform during the fastening process by the form punch while the form punch is heated.

3. The driver according to claim 1, wherein the deforming portion is configured to deform during the fastening process by the form punch while the form punch is vibrating ultrasonically after driving down onto the plastic dome ends and the vibrations are transmitted to the plastic dome ends, whereby the plastic dome ends are heated.

4. The driver according to claim 1, wherein each dome has surrounding supporting walls which extend as far as the inner surface of the sheet casing, and a gap exists between each supporting wall and the dome at a point on the dome where the dome is configured to pass through the hole in the sheet casing, the gaps being configured to receive the sheet casing as the sheet casing is deformed into the gaps as the mushroom-shaped ends are formed.

5. The driver according to claim 1, wherein each dome has an overall longitudinal dimension perpendicular to the sheet casing and an overall transverse dimension parallel to the sheet casing, and the longitudinal dimension is larger than the transverse dimension.

* * * * *